US009658842B2

(12) United States Patent
Rowe et al.

(10) Patent No.: US 9,658,842 B2
(45) Date of Patent: *May 23, 2017

(54) APPLICATION RUNTIME EXPERT FOR DEPLOYMENT OF AN APPLICATION ON MULTIPLE COMPUTER SYSTEMS

(71) Applicant: International Business Machines Corporation, Armonk, NY (US)

(72) Inventors: Timothy C. Rowe, Rochester, MN (US); Mark D. Schroeder, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 304 days.

This patent is subject to a terminal disclaimer.

(21) Appl. No.: 14/250,625

(22) Filed: Apr. 11, 2014

(65) Prior Publication Data

US 2014/0223422 A1 Aug. 7, 2014

Related U.S. Application Data

(63) Continuation of application No. 13/765,662, filed on Feb. 12, 2013, now Pat. No. 8,762,989, which is a continuation of application No. 12/708,590, filed on Feb. 19, 2010, now abandoned.

(51) Int. Cl.
*G06F 9/445* (2006.01)

(52) U.S. Cl.
CPC ............. *G06F 8/65* (2013.01); *G06F 8/60* (2013.01); *G06F 8/61* (2013.01)

(58) Field of Classification Search
CPC ............... G06F 8/65; G06F 8/60; G06F 8/61
See application file for complete search history.

(56) References Cited

U.S. PATENT DOCUMENTS

| 6,023,586 | A | * | 2/2000 | Gaisford | G06F 8/60 707/999.01 |
|---|---|---|---|---|---|
| 6,560,776 | B1 | | 5/2003 | Breggin et al. | |
| 7,206,817 | B2 | | 4/2007 | Fanshier et al. | |
| 2002/0147972 | A1 | * | 10/2002 | Olmeda | G06F 8/60 717/174 |
| 2004/0015961 | A1 | | 1/2004 | Chefalas et al. | |
| 2004/0177352 | A1 | * | 9/2004 | Narayanaswamy et al. | 717/169 |

(Continued)

FOREIGN PATENT DOCUMENTS

EP 1211596 A1 6/2002

*Primary Examiner* — Viva Miller
(74) *Attorney, Agent, or Firm* — Martin & Associates, LLC; Bret J. Petersen

(57) ABSTRACT

An application Runtime Expert (ARE) manages deployment of application software on multiple computer systems. The ARE assists the user in verifying and fixing configuration and environment details of an application deployed on multiple computer systems. The ARE creates a user configurable XML template that contains configuration and environment details based on information collected from a master system that has a known good deployment. The ARE allows a user to edit the XML logic in the template and add plug-ins to the template. The XML template with the added plug-ins are sent to a target system and used to verify the deployment on the target system compared to the master system and to make fixes to the target system's configuration.

19 Claims, 8 Drawing Sheets

(56) References Cited

U.S. PATENT DOCUMENTS

| | | | |
|---|---|---|---|
| 2006/0031226 A1* | 2/2006 | Cope .......................... | G06F 8/61 |
| 2006/0112369 A1 | 5/2006 | Yu et al. | |
| 2006/0112383 A1* | 5/2006 | Chang et al. ................. | 717/168 |
| 2007/0256070 A1* | 11/2007 | Bykov ...................... | G06F 8/60 |
| | | | 717/174 |
| 2009/0158099 A1 | 6/2009 | Cui | |
| 2009/0187822 A1* | 7/2009 | Abreu et al. ................. | 715/700 |
| 2010/0031247 A1* | 2/2010 | Arnold et al. ................ | 717/174 |

* cited by examiner

```xml
<?xml version="1.0" encoding="UTF-8"?>
<systemValueSet version="1.0">
  <systemValues>
    <systemValue name="language">
      <check errorLevel="Warning" matchCase="false" type="equals" value="English"/>
      <fixAction category="System Value" fixMethodReference="_REFERENCE_0">
        <description>System value 'language' is not correct</description>
        <defineReference type "method" className="FixHelper" methodName="fixSystemValue"
            name="_REFERENCE_0">
          <parameters>
            <parameter type="literal" value="language"/>
            <parameter type="literal" value="English"/>
          </parameters>
        </defineReference>
      </fixAction>
    </systemValue>
    <systemValue name="country">
      <check errorLevel="Error" matchCase="false" type="in" value="US"/>
      <fixAction category="System Value" fixMethodReference="_REFERENCE_1">
        <description>System value 'country' is not correct</description>
        <defineReference type "method" className="FixHelper" methodName="fixSystemValue"
            name="_REFERENCE_1">
          <parameters>
            <parameter type="literal" value="country"/>
            <parameter type="literal" value="US"/>
          </parameters>
        </defineReference>
      </fixAction>
    </systemValue>
  </systemValues>
</systemValueSet>
```

```
public class SamplePlugin extends BasePlugin { protected Version initPluginVersion() {
                return new Version(1, 0, 0);
        } protected ResultInfo runImpl() {
                reportStep("Checking the PATH environment variable");         }- 610
                String pathEnv = System.getenv("PATH");

if (pathEnv.contains("/usr/bin")) {
                        reportStepDetail("OK: PATH environment variable is correct");    }- 612
                }
                else {
                        reportError("PATH environment variable is incorrect.  Its value is: " + pathEnv);
                }
                return new ResultInfo(true);                                              614
        } public String getCommonName() {
                return "Sample Plugin";
        } public String getDescription() {
                return "A sample plugin";
        }
}
```

FIG. 6

APPLICATION RUNTIME EXPERT FOR DEPLOYMENT OF AN APPLICATION ON MULTIPLE COMPUTER SYSTEMS

BACKGROUND

1. Technical Field

This disclosure generally relates to computer tools for managing computer systems, and more specifically relates to an application runtime expert for management of software deployed on multiple computer systems.

2. Background Art

Computer software applications are becoming increasingly complex. An application may be installed on many computer systems and different computer platforms but differences in the install and configuration of the software and the runtime environment details may lead to software errors, management, and runtime problems. Configuring and maintaining application software installed on multiple computer systems is thus becoming increasingly complex and expensive. Each application has many configuration and environment details that must be setup to insure the application will execute properly. System administrators need to be able to verify that the installation and configuration of applications are correct to insure proper execution and to trouble shoot errors. In addition, software vendors need a way to quickly and accurately verify their software product install is correct and that the environment in which the software runs is as expected for their software product.

Prior art software tools have been developed to allow an administrator, software vendor, or user to ascertain the health of a computer system. These tools are used to check application configuration and operating system environment details for an application deployment on a computer system. The details checked are limited to those originally coded in the health tool. Thus the prior art tools are typically limited to checking the operating system environment of a single system against a set of pre-programmed, non-configurable parameters.

BRIEF SUMMARY

The disclosure and claims herein are directed to an Application Runtime Expert (ARE) for managing application software on multiple computer systems. The ARE assists the user in verifying and fixing the configuration and environment details of an application deployment on multiple computer systems. The ARE creates a user configurable template that contains configuration and environment details based on information collected from a reference system that has a known good deployment. The template preferably consists of one or more extensible markup language (XML) files. The ARE allows a user to edit the XML files in the template. In addition, the ARE allows the user to add plug-ins to the template. The XML template with the added plug-ins are sent to a target system and used to verify the deployment on the target system compared to the reference system and to make fixes to the configuration based on problems found during the verification. The ARE also prepares a report of the deployment verification that was performed on the target system. Plug-ins added to the template are executed on the target system to provide additional deployment verification for the report. The user configurable features allow the user to edit the logic of the deployment template to specify precisely what configuration items should be checked by the ARE for the user's specific application, specify environment details, and to add additional plug-ins to extend the template for management of application specific or platform specific deployment details.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 5 illustrates a sample XML file of a deployment template to verify a system value in a target system;

FIG. 6 illustrates a sample custom plugin created by a user to include in a deployment template;

DETAILED DESCRIPTION

Figure 1:
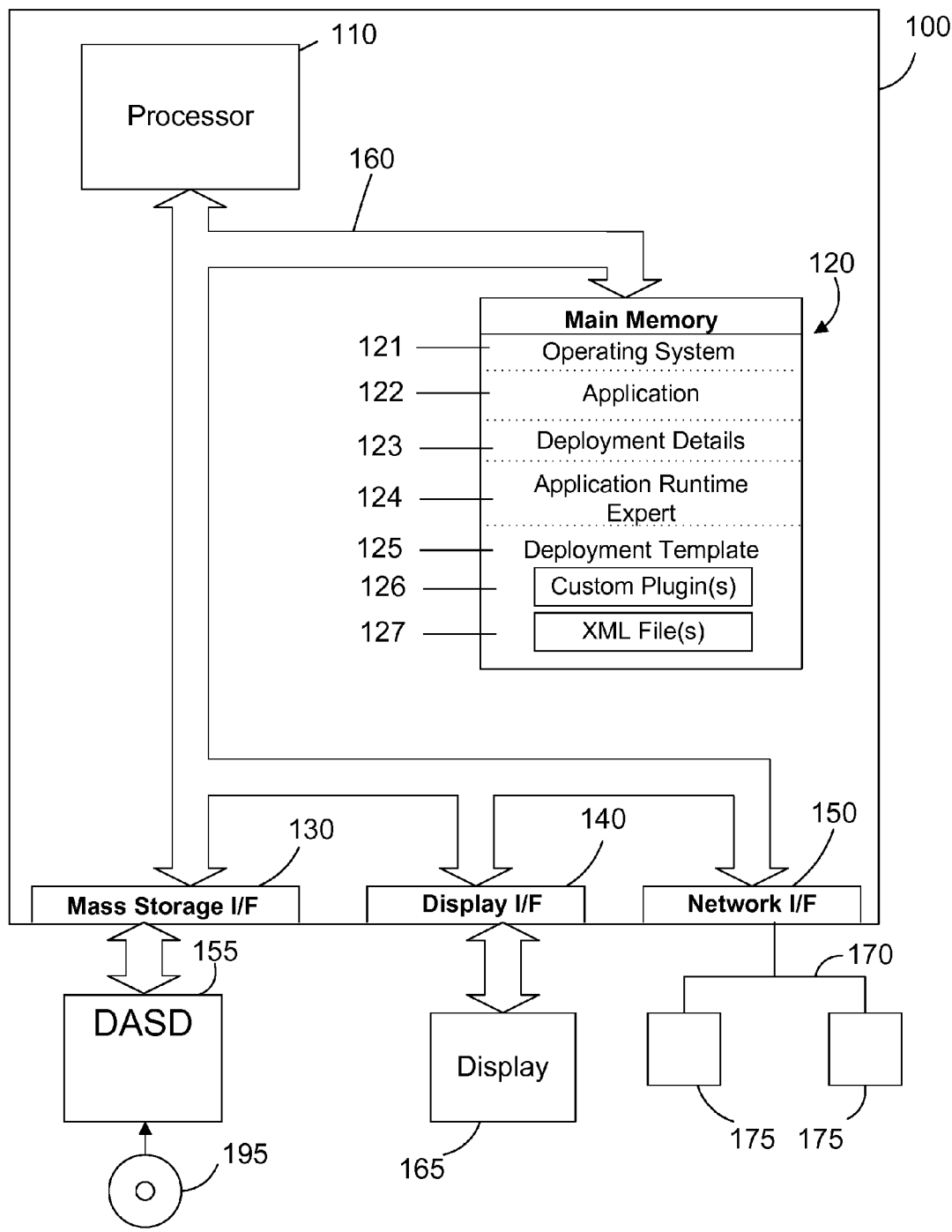
FIG. 1 is a block diagram of a computer system with an application runtime expert as described herein.

An Application Runtime Expert (ARE) for managing application software on multiple computer systems is described herein. The ARE assists the user in verifying and fixing the configuration and environment details of an application deployment on multiple computer systems. The ARE creates a user configurable template that contains configuration and environment details based on information collected from a reference system that has a known good deployment. The template preferably consists of one or more extensible markup language (XML) files. The ARE allows a user to edit the XML files in the template. In addition, the ARE allows the user to add plug-ins to the template. The XML template with the added plug-ins are sent to a target system and used to verify the deployment on the target system compared to the reference system and to make fixes to the configuration based on problems found during the verification. The ARE also prepares a report of the deployment verification that was performed on the target system. Plug-ins added to the template are executed on the target system to provide additional deployment verification for the report. The user configurable features allow the user to edit the logic of the deployment template to specify precisely what configuration items should be checked by the ARE for the user's specific application, specify environment details, and to add additional plug-ins to extend the template for management of application specific or platform specific deployment details.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, a computer system 100 is one suitable implementation of a computer system that includes an application runtime expert as described herein. Computer system 100 is an International Business Machines Corporation (IBM) System i (iSeries) computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195.

Main memory 120 preferably contains an operating system 121. Operating system 121 is a multitasking operating system known in the industry as i5/OS; however, those skilled in the art will appreciate that the spirit and scope of this disclosure is not limited to any one operating system. The memory further includes a software application 122. Deployment details 123 is application configuration information that includes details of the application, the computer system environment and the operating system where the application is installed as described further below. The memory further contains an application runtime expert (ARE 124) as described herein. With user input, the ARE 124 produces a deployment template 125 with one or more custom plugins 126 and one or more XML Files 127.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, application 122, deployment details 123, ARE 124 and the deployment template 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the ARE 124.

Although computer system 100 is shown to contain only a single processor and a single system bus, those skilled in the art will appreciate that a virtualization manager may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
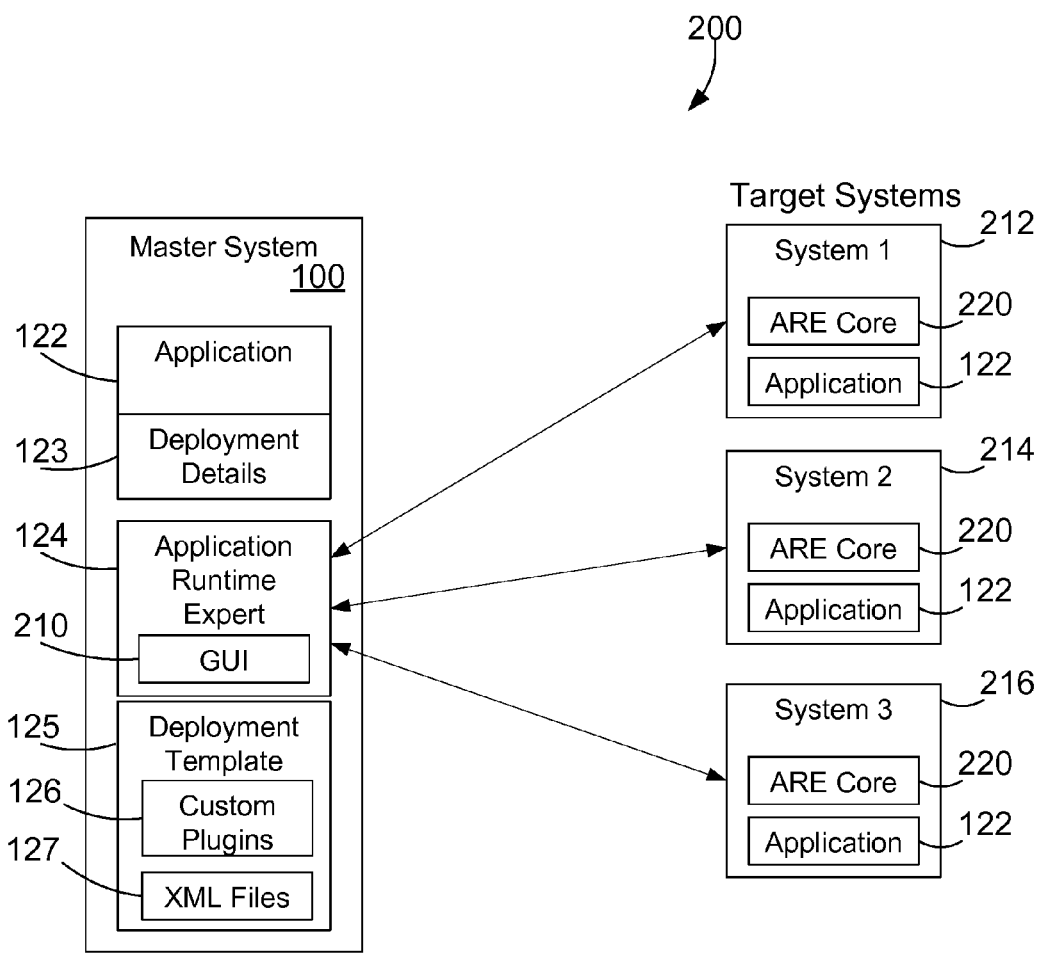
FIG. 2 is a block diagram of a computer system utilizing an application runtime expert (ARE) to verify a deployment on multiple target computers.

FIG. 2 illustrates a block diagram of a computer system 200 utilizing an ARE as described and claimed herein. The master system 100 is preferably a computer system as described in FIG. 1. The master computer system 100 has an application 122 with deployment details 123, an ARE 124 with a graphical user interface (GUI) 210, and a deployment template 125 with custom plugins 126 and XML Files 127. In the illustrated example, a user uses the GUI 210 to create a deployment template 125 to verify and fix deployment details on the target systems 212, 214, 216 based on deployment details on a reference system. In this example, the reference system is the master system 100. The ARE 124 collects the deployment details for the application 122 on the master system 100 depending on the selections made by the user and then creates the deployment template 125. After the deployment template is created, a user may customize the deployment template by editing the XML files and adding custom plugins 126 as described further below. Target systems 212, 214, 216 are connected to the master system 100 with a network (175 in FIG. 1 as described above). The target systems 212, 214, 216 each include a copy of the application 122. The ARE 124 communicates with multiple target systems 212, 214, 216 to verify the deployment of application 122 on the target systems. The ARE 124 on the master system 100 sends the deployment template 125 to an ARE core 220 on each of the target systems 212, 214, 216. The ARE core is a copy of the ARE, or some portion of the ARE that uses the deployment template 125 on the target system to verify and fix the deployment as described herein.

Figure 3:
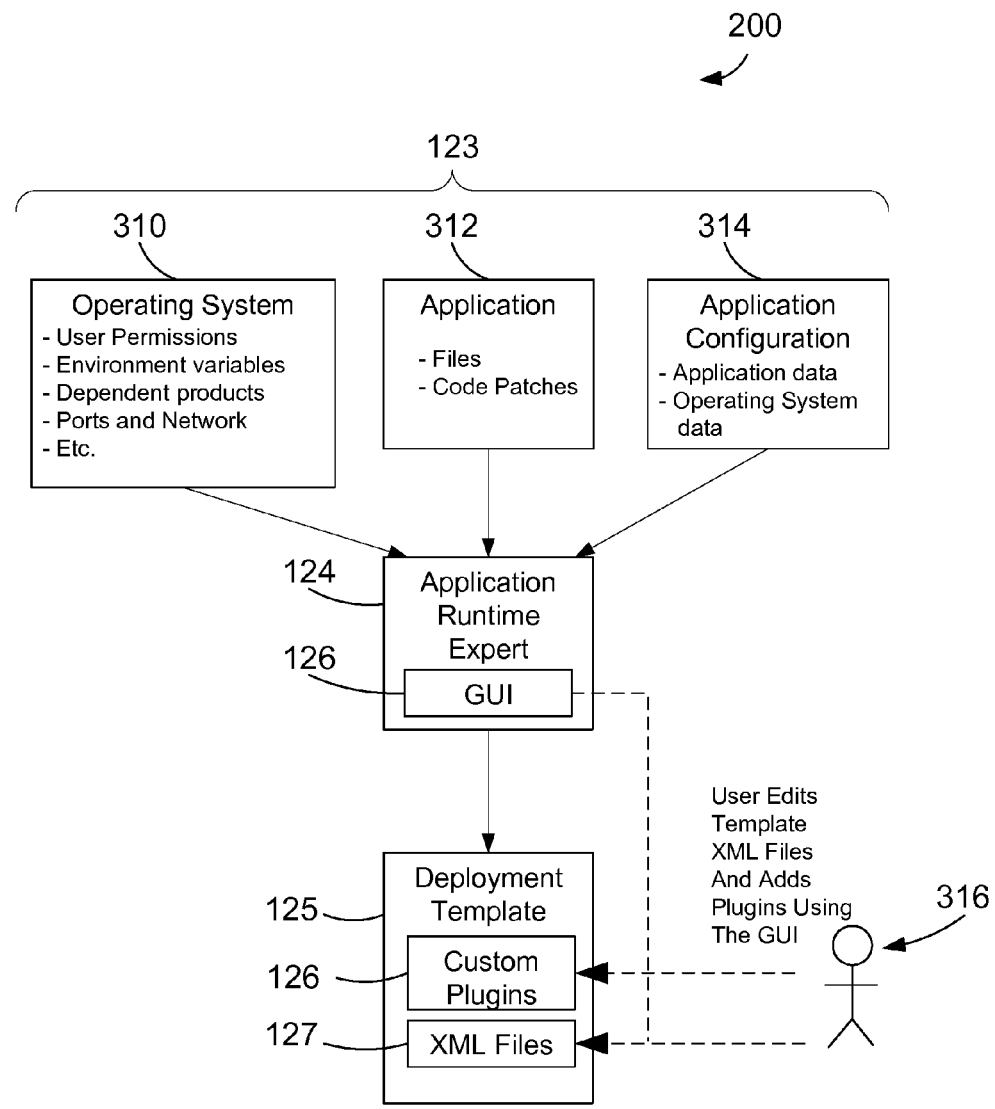
FIG. 3 is a block diagram that shows further details of the ARE 124 being used to create a deployment template.

FIG. 3 illustrates a block diagram that shows further details of the ARE 124 being used to create a user configurable deployment template 125. The ARE 124 collects deployment details 123 of the application (122 FIG. 1) to create the deployment template 125. The deployment details 123 include operating system deployment details 310, application deployment details 312 and application configuration deployment details 314. The deployment details are physical condition and runtime attributes of the application that can be verified and/or fixed by the ARE. A user 316 utilizes the GUI 210 of the ARE 124 to create and configure the deployment template 125 for deployment verification of the application 222 on each of the target systems 212, 214, 216. The user 316 utilizes the GUI 210 of the ARE 124 to make a selection of deployment details the user wishes to check on the target system. Alternatively, the system could verify all possible deployment details. Next, the ARE 124 collects the deployment details for the application 122 on the reference system and then creates the deployment template 125 depending on the selections made by the user. Thus, the deployment template is created with XML 127 files that contain information about the specific items to verify as selected by the user. Preferably, after the template is created, a user can edit the logic of the XML files 127 to further customize the verification and fixes for the target system. The GUI 210 of the ARE 124 allows a user 316 to customize a deployment template to verify the details of the operating system 310, application 312, or application configuration 314 that are specific to the deployment for which the template is being created. The ARE also provides for the user 316 to insert additional user-created, custom plugins 126 into the deployment template to augment the deployment verification of the user's specific application and/or environment. The deployment template may also include predefined plugins to be executed on the target system for deployment verification as described further below.

The deployment details 123 in FIG. 3 are not all inclusive. The illustrated deployment details 123 are representative of the physical condition, runtime configuration and runtime attributes related to an application deployed on a computer system that can be included in the deployment template. There are literally hundreds of deployment details that could be implemented as described herein. The deployment details are gathered by the ARE and used to create a deployment template. The operating system deployment details 310 may include user permissions of individuals or groups specified by a user ID. The operating system deployment details 310 may also include environment variables defined by the system, or details used to verify system wide environment information such as network verification and configuration details, to insure the network on the target system is configured and working as expected. The operating system deployment details may further include dependent products on the system. The dependent products details are used by the ARE to insure that all dependent software required by the application is installed on the target system. Other operating system deployment details may include ports and network, etc. The application deployment details 312 may include a listing of all the files and programs needed by the application on the target system. The application deployment details 312 may also include fixes or code patches that are needed by the application. The application configuration deployment details 314 include application configuration data such as database attributes and configuration attributes of a property file. Further, the operating system data configuration deployment details may include network configuration and exit points (code hooks for system calls). Each of the categories of deployment details may include file and directory attributes, file and directory authorities.

Figure 4:
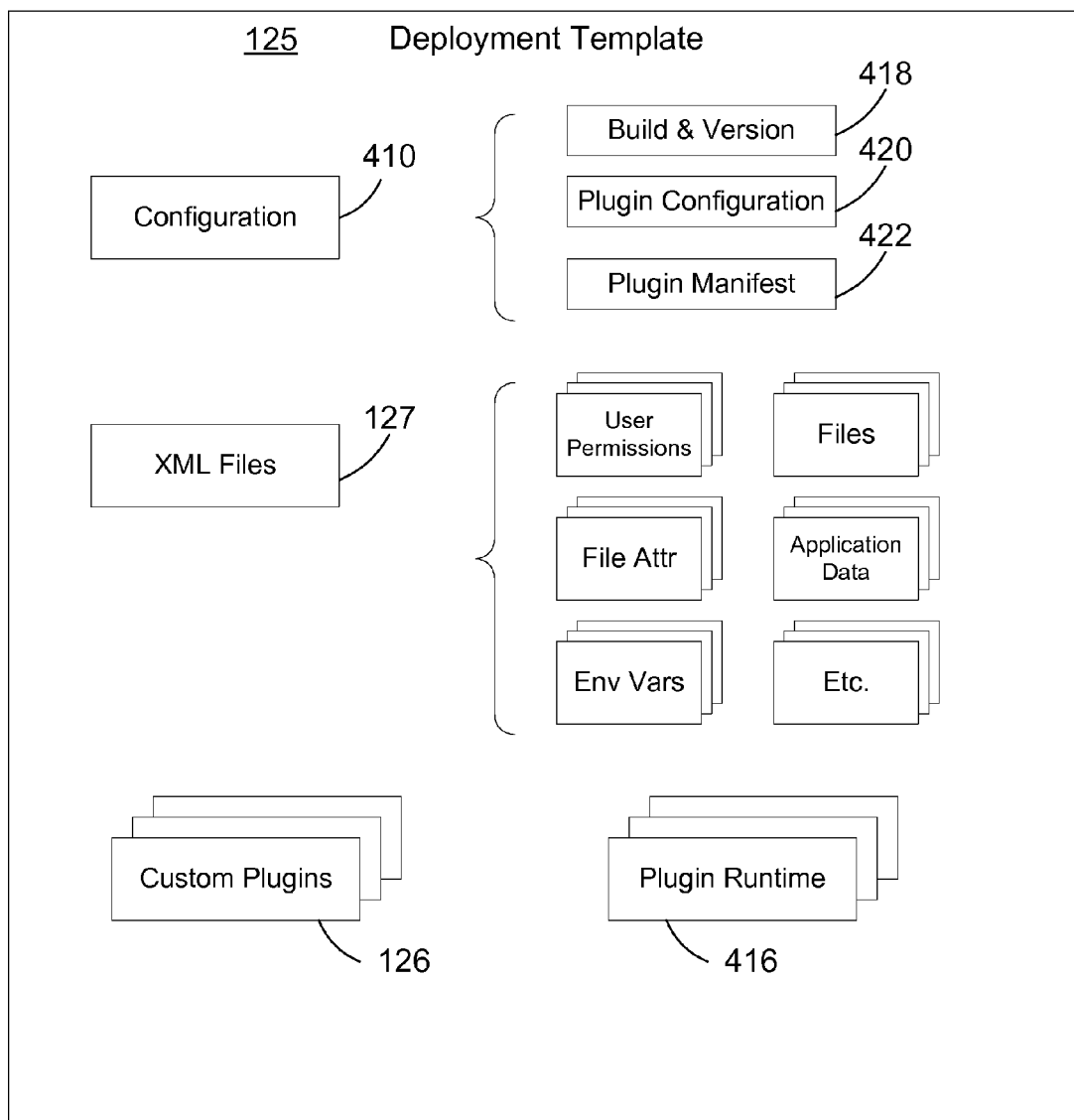
FIG. 4 is a block diagram illustrating the structure of a deployment template.

FIG. 4 is a block diagram to illustrate the structure of a deployment template 125 as described above. The deployment template is preferably a set of files packaged together into a compressed file such as a Java Archive file (JAR). The deployment template preferably includes a configuration information 410, XML files 127, custom plugins 126, and plugin runtime files 416. The configuration information 410 includes build and version information 418, plugin configuration 420 and plugin manifest 422. The build and version information describes the data/time the template was built and the template version. The plugin configuration describes information needed by specific plugins. For example, if a plugin needs an XML file for input (to tell the plugin what to check or what an expected state should be), that input file is specified in the plugin configuration. The plugin manifest is a list of plugins to be run. The ARE core inspects the manifest to determine what plugins to run. The configuration information may be stored in XML and the build and version info 418 may be implemented as a Java class. The XML files 127 may include files for each of the deployment details 123 described above. Some of those are shown here for illustration.

The XML files 127 are logic or rule files for verifying and/or fixing a corresponding configuration detail in the target system. The XML files are used by the plugin code or code in the ARE core to verify or fix the target deployment as described further below. The XML files are generated when information about the deployment is collected from the "good" system, which is used as a reference for creating the deployment template. In the examples described herein, the "good" system with the reference deployment is on the master system, but the "good" system may be another remotely located computer system used by the master system to create the deployment template. One or more XML files may be created for each of the different physical condition, runtime configuration and runtime attributes that are to be verified on the target system as illustrated by the multiple boxes for each attribute.

The deployment template 125 preferably has custom plugins 126 and predefined plugin runtime code 416. The plugins 126, 416 are used by the ARE core to verify and fix deployment details in the target system. The plugin runtime 416 is preferably compiled JAVA code. The custom plugins 126 are plugins written by the user and added to the deployment template by the user when creating the template using the ARE GUI 210. The ARE core on the target system executes the plugins 126, 416 in the deployment template 125. The plugins 126, 416 use the information in the XML files 127 to verify and/or fix an attribute of the deployment on the target system. The ARE core may or may not contain all the code necessary to verify the target system. The deployment template accommodates plugin runtime code 416 to utilize the XML files to verify the deployment details. Alternatively the plugin runtime code 416 for the predefined deployment details could be part of the ARE core 220 (FIG. 2) on the target systems.

As introduced above, the ARE allows the user to edit the logic of the deployment template in the XML files corresponding to the deployment details to be verified on the target system. For example, an XML file generated by the ARE may check the files needed for the application. The user may modify the logic of this XML file to check for different files based on the different release versions of the software to customize the verification to accommodate these different versions. The user would simply add if/then logic to the XML file to check for the needed files for each version of the application. Similarly, the user can customize the XML files 126 for other deployment details.

In addition to verification of deployment details, the ARE structure described herein supports the user being able to fix an attribute of the target system. For example, when information is collected for the deployment, information about file authorities is collected. File authorities determine permission users have to files on a system. Using the file authority information in an XML file in the deployment template, the file authority plugin, which is one plugin included in the plugin runtime code 416, can modify a file's authority on the target system to match the file's authority on the reference system. Similarly, many different application configuration and environment details can be fixed in addition to being verified on the target system. Alternatively, the user could fix attributes on the target system by editing XML logic for predefined plugins with a fix feature. In another example, the user could make fixes by adding additional plugins that can fix deployment details of the target system based on data collected from the reference system and passed to the ARE core in the deployment template.

FIG. 5 illustrates a sample XML file of a deployment template to fix a deployment detail in a target system. In this simple example, two system values on the target system are compared with values found on the reference system. The system values checked are the system's language 510, and the country 512 assigned to the system. This sample XML file is highly simplified to illustrate a piece of the deployment template. An actual deployment template would comprise many such system checks to verify the target system against the reference deployment on the master system. In addition, system values on the target system can be corrected or fixed to comply with the reference deployment. In the sample XML file, a check of the system language is done to determine if the language is English 514. A fix of the system value (language) is made with a call to a JAVA method using a reference in the XML (REFERENCE_0) 516. In this example, a JAVA Virtual Machine (JVM) processes this XML file and recognizes the defined reference and uses the reference to invoke a JAVA method "fixSystemValue" 518. The JAVA method "fixSystemValue" makes the fix to the corresponding system values using the defined parameters 520. In the same way, the system value for country 512 is checked and fixed with the parameters for country 522.

FIG. 6 illustrates a sample custom plugin 200 created by a user to include in a deployment template. This simple example illustrates what a plugin format would look like and its basic operation. The example plugin 200 checks an environment variable called PATH 610. If the environment variable includes "/usr/bin" as part of the path, then the plugin 200 reports the PATH environment variable is correct 612. If the environment variable does not includes "/usr/bin" as part of the path, then the plugin 200 reports the PATH environment variable is incorrect 614.

Figure 7:
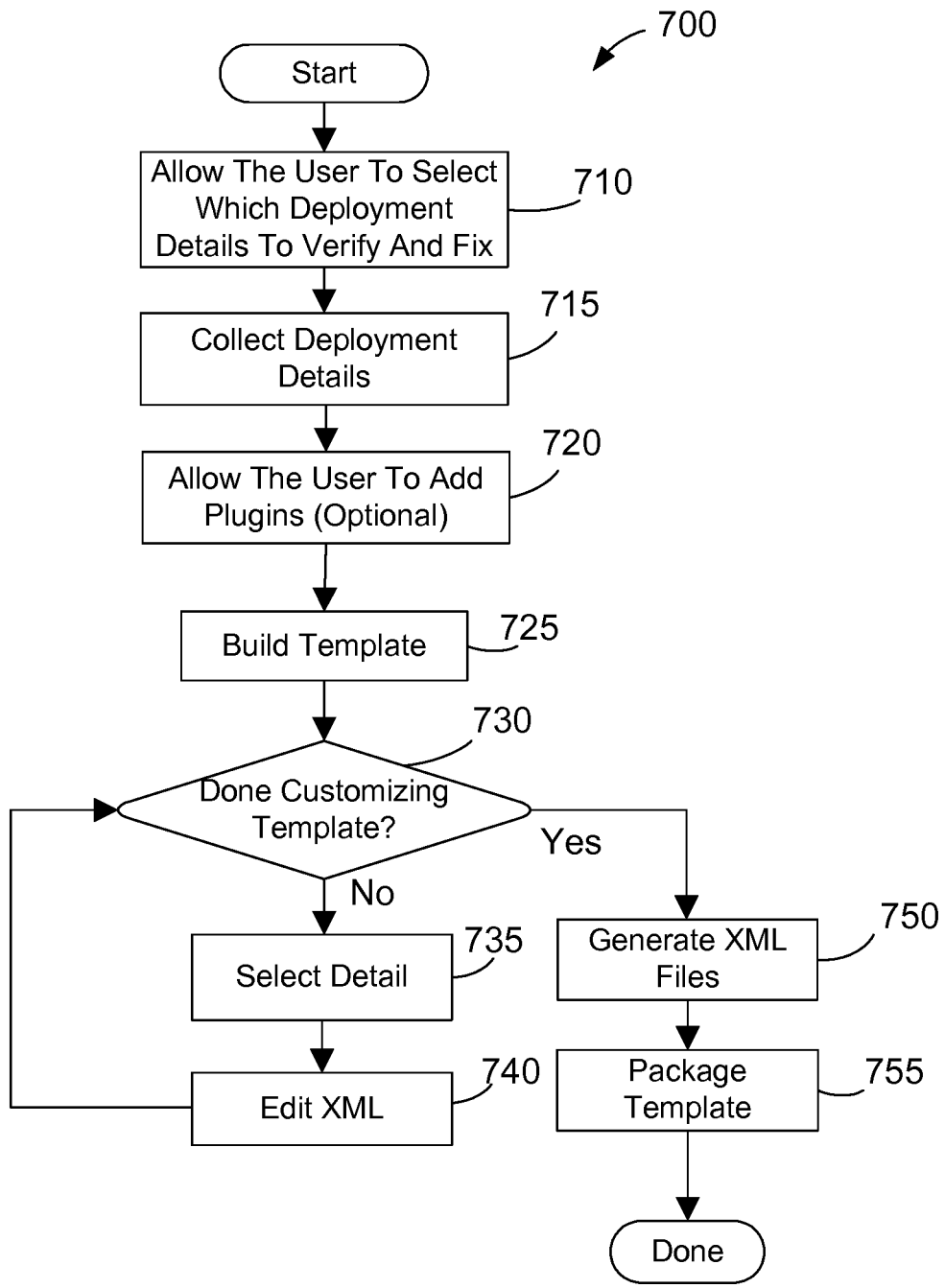
FIG. 7 is a method flow diagram for creating a deployment template.

FIG. 7 shows a method 700 for creating a deployment template as claimed herein. The steps in method 700 are preferably performed by the ARE 123 (FIG. 1) in conjunction with input from a system user via the graphical user interface 210 (FIG. 2) to create a deployment template 125 (FIG. 1). The deployment template is then used to verify and fix the deployment of the application on the target systems. First, allow the user to select which deployment details to include in the deployment template and verify and fix on the target system (step 710). Next, collect deployment details for the application on the known good system (step 715). Optionally, then allow the user to add plugins (step 730). Then build a template using the collected details (step 725). If the user is not done customizing the template (step 730=no), then the user selects a detail of the deployment to modify (step 735). Then the user is allowed to edit the logic of selected deployment detail (step 740) and return to step 730. The user preferably edits the logic in an XML file associated with the selected detail in the manner described above. If the user is done customizing the template (step 730=yes), then generate the XML files (step 750) and package them into a template by putting all the files into a compressed file (step 755) such as a compressed Java ARchive file (JAR).

Figure 8:
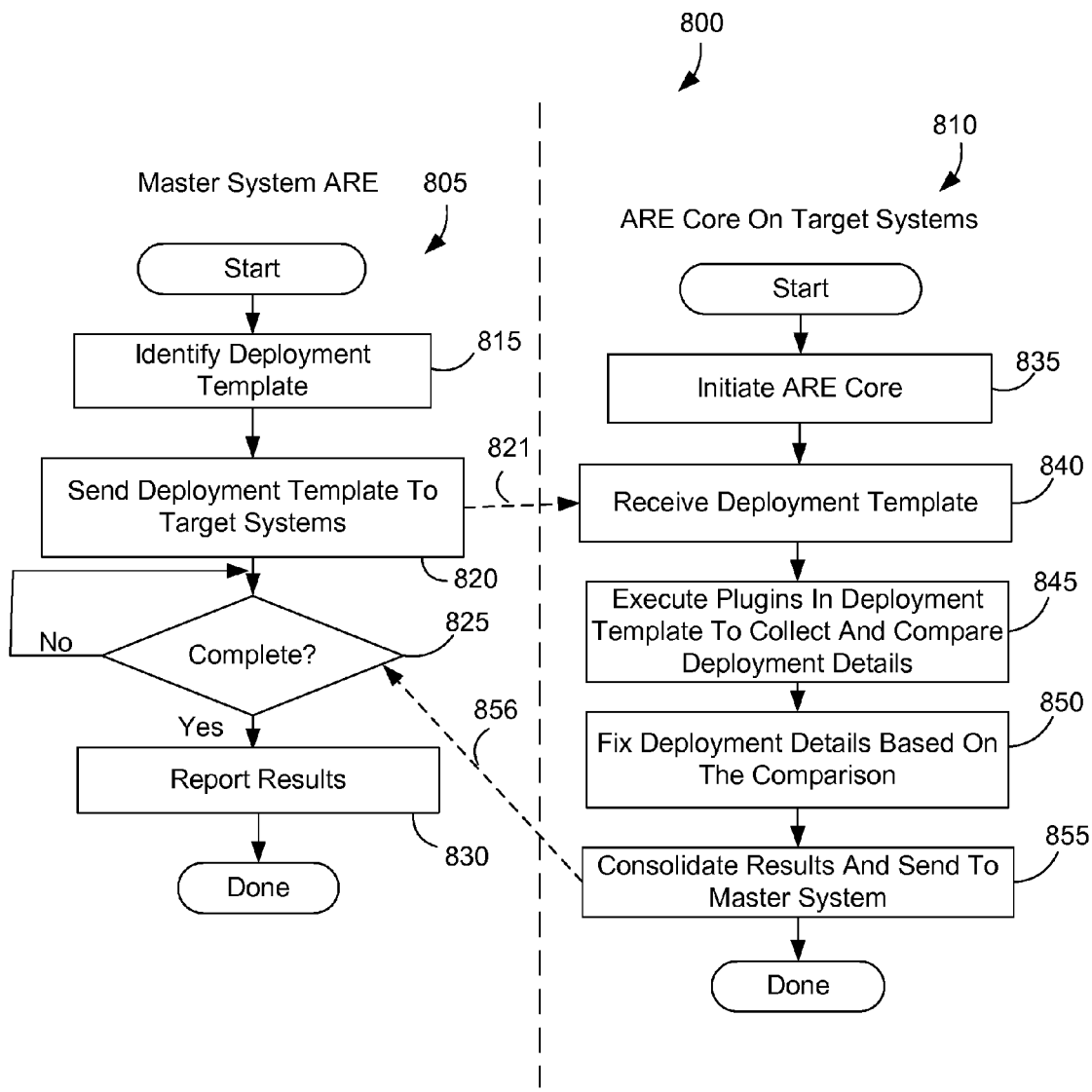
FIG. 8 is a method flow diagram for verifying the deployment of a target system using a deployment template as claimed herein.

FIG. 8 shows a method 800 for verifying and fixing the deployment of a target system using a deployment template as claimed herein. The steps 805 are preferably performed by the ARE 124 (FIG. 1) on the master system, and the steps 810 are preferably performed by the ARE core 220 (FIG. 2) on a remote system. On the master system, first identify an ARE deployment template (step 815). This step may be a user input to select a deployment template that was created as described above with reference to method 700. Next, send the deployment template to the target systems (step 820). If the target systems have not completed processing the deployment template (step 825=no), then loop back to step 825. When the target systems have completed processing the deployment template (step 825=yes), then report the results (step 830) and the method on the master system is done.

Again referring to FIG. 8, the method steps 810 of the ARE core on the target system are as follows. The ARE core may be setup at a different time than the deployment template as assumed here, or may be setup in conjunction with sending the deployment template. First, initiate the ARE core on the target systems (step 835). Initiating the ARE core may be done by the user, or may be done by the ARE on the master system in conjunction with sending the deployment template. The target system receives (arrow 821) a deployment template (step 840). Next, the ARE core executes plugins in the deployment template to collect and compare deployment details on the target system with the deployment details from the reference system in the deployment template (step 845). Then, optionally, fix deployment details based on the comparison in the previous step (step 850). Consolidate the results of the comparison and send (arrow 856) the results to the master system (step 855). The master system will then report the results as described above. The method is then done.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As described above, an ARE assists the user in verifying and fixing configuration and environment details of an application deployed on multiple computer systems using a user customizable XML template that contains configuration and environment details from a master system that has a known good deployment. In the illustrated examples, the ARE allows a user to verify an application deployment on multiple systems and platforms with the customized template that describes the configuration of a deployed application that can be executed with a generic core runtime code.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   a master computer system comprising at least one processor and a memory coupled to the at least one processor having an installed application;
   an Application Runtime Expert (ARE) that verifies a deployment of an application on a target computer system, wherein the deployment of the application includes the runtime configuration and environment of the application;
   wherein the ARE creates a deployment template for verification of the deployment of the application, wherein the deployment template is user configurable and contains runtime configuration details, and environment details collected from a reference system with a known good deployment of the application;
   wherein the ARE sends the deployment template to the target computer to be used by an ARE core which is a copy of the ARE executing on the target computer to verify the deployment of the application on the target computer system; and
   wherein the ARE allows the user to edit the deployment template to customize logic to fix a deployment detail of the deployment of the application on the target computer system.

2. The apparatus of claim 1 wherein the ARE allows a user to customize the deployment template by editing one or more logic files used by plugins to verify corresponding details of the deployment of the application on a target computer system.

3. The apparatus of claim 1 wherein the ARE allows the user to edit the deployment template to add a user defined plugin that implements a user specified verification of the deployment of the application on a target computer system.

4. The apparatus of claim 1 wherein the target computer system is located remotely from the master system.

5. The apparatus of claim 1 wherein the reference system with the known good deployment is on the master system.

6. The apparatus of claim 1 wherein the deployment template comprises one or more extensible markup language (XML) files compressed into a Java Archive file (JAR).

7. An article of manufacture comprising: an application runtime expert stored on a computer non-transitory recordable media that when executed by a computer processor performs the steps of:

collecting deployment details from a known good deployment of an application on a reference system where the deployment details comprise configuration details and environment details of the application;

building a user configurable deployment template that contains logic files to verify the deployment details, wherein the deployment template includes logic to fix a deployment detail of the deployment of the application;

customizing the deployment template with user input;

receiving the deployment template on a target system;

executing code on the target system that uses the deployment template to collect deployment details from the target system;

comparing deployment details of the reference system with deployment details from the target system;

fixing deployment details on the target system using the logic included in the deployment template;

reporting results of the comparing step; and wherein the step of customizing the deployment template allows a user to edit the logic files to customize the logic to fix a deployment detail of the deployment of the application on the target computer system.

8. The article of manufacture of claim 7 wherein the step of customizing the deployment template allows the user to edit the deployment template to add a user defined plugin that implements a user specified verification of the deployment of the application on a target computer system.

9. The article of manufacture of claim 7 wherein the deployment template comprises one or more extensible markup language (XML) files compressed into a Java Archive file (JAR).

10. The article of manufacture of claim 7 further comprising the step of allowing the user to select which deployment detail checks to place in the deployment template.

11. A computer-implemented method for verifying a deployment of an application on a target computer system, the method comprising the steps of:

collecting deployment details from a known good deployment of the application on a reference system where the deployment details comprise configuration details and environment details of the application;

building a user configurable deployment template that contains logic files to verify the deployment details, by allowing the user to edit the deployment template logic files to fix a deployment detail of the deployment of the application;

receiving the deployment template on the computer target system;

executing code on the target system that uses the deployment template to collect deployment details from the target system;

comparing deployment details of the reference system with deployment details from the target system;

fixing deployment details on the target system using the logic included in the deployment template;

reporting results of the comparing step; and wherein the method steps are implemented in a computer software program stored in computer memory and executed by a computer processor.

12. The method of claim 11 further comprising the step of allowing a user to edit the logic files to customize the deployment template.

13. The method of claim 12 wherein the step of customizing the deployment template by the user includes allowing the user to add a user defined plugin that implements a user specified verification of the deployment of the application on a target computer system.

14. The method of claim 11 wherein the deployment template comprises one or more extensible markup language (XML) files compressed into a Java Archive file (JAR).

15. The method of claim 11 further comprising the step of allowing the user to select which deployment detail checks to place in the deployment template.

16. An apparatus comprising:

a master computer system comprising at least one processor and a memory coupled to the at least one processor having an installed application;

an Application Runtime Expert (ARE) that verifies a deployment of an application on a target computer system, wherein the deployment of the application includes the runtime configuration and environment of the application;

wherein the ARE creates a deployment template for verification of the deployment of the application, wherein the deployment template is user configurable and contains runtime configuration details, and environment details collected from a reference system with a known good deployment of the application;

wherein the ARE sends the deployment template to the ARE core which is a copy of the ARE executing on the target computer;

wherein the ARE core executing on the target computer receives the deployment template and executes plugins in the deployment template to verify the deployment of the application on the target computer system; and wherein the ARE allows the user to edit the deployment template to customize logic to fix a deployment detail of the deployment of the application on the target computer system and the ARE core uses the logic to fix the deployment detail.

17. The apparatus of claim 16 wherein the ARE allows a user to customize the deployment template by editing one or more logic files used by plugins to verify corresponding details of the deployment of the application on a target computer system.

18. The apparatus of claim 16 wherein the ARE allows the user to edit the deployment template to add a user defined plugin that implements a user specified verification of the deployment of the application on a target computer system.

19. The apparatus of claim 16 wherein the deployment template comprises one or more extensible markup language (XML) files compressed into a Java Archive file (JAR).

* * * * *